United States Patent
Hessler et al.

(10) Patent No.: US 9,955,382 B2
(45) Date of Patent: Apr. 24, 2018

(54) HANDLING OF WIRELESS BACKHAUL LINKS

(71) Applicant: TELEFONAKTIEBOLAGET LM ERICSSON (PUBL), Stockholm (SE)

(72) Inventors: Martin Hessler, Linköping (SE); Joel Berglund, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 35 days.

(21) Appl. No.: 15/117,983

(22) PCT Filed: Feb. 17, 2014

(86) PCT No.: PCT/EP2014/053046
§ 371 (c)(1),
(2) Date: Aug. 10, 2016

(87) PCT Pub. No.: WO2015/120917
PCT Pub. Date: Aug. 20, 2015

(65) Prior Publication Data
US 2016/0366614 A1   Dec. 15, 2016

(51) Int. Cl.
*H04W 28/08* (2009.01)
*H04W 28/02* (2009.01)
*H04W 72/08* (2009.01)

(52) U.S. Cl.
CPC ....... *H04W 28/08* (2013.01); *H04W 28/0268* (2013.01); *H04W 72/082* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 9,100,214 B1* | 8/2015 | Joseph | H04L 12/4641 |
| 2002/0028675 A1 | 3/2002 | Schmutz et al. | |
| 2006/0104232 A1* | 5/2006 | Gidwani | H04W 28/18 370/328 |
| 2006/0203746 A1 | 9/2006 | Maggenti et al. | |
| 2008/0016198 A1* | 1/2008 | Johnston-Watt | H04L 67/104 709/223 |
| 2008/0274701 A1 | 11/2008 | Manjeshwar et al. | |
| 2010/0284283 A1* | 11/2010 | Golic | H04L 63/1416 370/242 |
| 2011/0051725 A1* | 3/2011 | Janneteau | H04L 12/18 370/390 |
| 2012/0281685 A1* | 11/2012 | Kotecha | H04W 76/04 370/338 |

(Continued)

*Primary Examiner* — Bunjob Jaroenchonwanit (57) ABSTRACT

There is provided handling of wireless links in a wireless backhaul network. Load information from an end-user access network and from a wireless backhaul network is acquired. A current network topology of the wireless backhaul network is associated with a current performance value as a function of the acquired load information. An estimated performance value for a new network topology is provided according to which at least one wireless link for a client node has been redirected from a current hub node sector to a new hub node sector. The at least one wireless link is redirected according to the new network topology in a case the estimated performance value is higher than the current performance value.

23 Claims, 4 Drawing Sheets

(56) References Cited

U.S. PATENT DOCUMENTS

| | | | |
|---|---|---|---|
| 2015/0040162 A1* | 2/2015 | Kotecha | H04N 21/2402 |
| | | | 725/44 |
| 2016/0127942 A1* | 5/2016 | Ghanadan | H04L 45/04 |
| | | | 370/237 |
| 2017/0171789 A1* | 6/2017 | Rost | H04W 36/22 |

* cited by examiner

HANDLING OF WIRELESS BACKHAUL LINKS

TECHNICAL FIELD

Embodiments presented herein relate to wireless backhaul networks, and particularly to a method, a network node, a computer program, and a computer program product for handling wireless links in a wireless backhaul network.

BACKGROUND

In communications networks, it may be challenging to obtain good performance and capacity for a given communications protocol, its parameters and the physical environment in which the communications network is deployed.

For example, increase in traffic within communications networks such as mobile broadband systems and an equally continuous increase in terms of the data rates requested by end-users accessing services provided by the communications networks may impact how cellular communications networks are deployed. One way of addressing this increase is to deploy lower-power network nodes, such as micro network nodes or pico network nodes, within the coverage area of a macro cell served by a macro network node. Examples where such additional network nodes may be deployed are scenarios where end-users are highly clustered. Examples where end-users may be highly clustered include, but are not limited to, around a square, in a shopping mall, or along a road in a rural area. Such a deployment of additional network nodes is referred to as a heterogeneous or multi-layered network deployment, where the underlying layer of low-power micro or pico network nodes does not need to provide full-area coverage. Rather, low-power network nodes may be deployed to increase capacity and achievable data rates where needed. Outside of the micro- or pico-layer coverage, end-users would access the communications network by means of the overlaid macro cell.

Backhauling based on the Long Term Evolution (LTE) telecommunications standards may be carried either over normal IMT-bands, e.g. the 2.6 GHz frequency band, or by running LTE baseband communications on higher radio frequencies, such as in the 28 GHz frequency band. LTE based backhauling implies that the pico network nodes are connected to a client node which is used to create a wireless link to a hub node.

In any of the above two cases, the wireless links are typically managed by LTE core control mechanisms. For example, the LTE Mobility Management Entity (MME) may be utilized for session control of the LTE links, and the Home Subscription Service (HSS) may be utilized for storing security and Quality of Service (QoS) characteristics of the wireless links individual end-user terminals embedded in the pico network node.

Moreover, in practice more than one client node may connect to a common hub node. This implies support for Radio Resource Management (RRM) functions, such as scheduling and prioritization of the traffic to and from the different clients, at the hub node.

To each client node there might be several pico network nodes, each of which may offer one or several different radio access technologies, such as based on the Universal Mobile Telecommunications System (UMTS), LTE, or IEEE 802.11x to the end-user terminals of the end-users. Therefore there is a need to differentiate between the corresponding backhaul traffic to different nodes in the communications network. For example, any LTE compliant traffic may need to end up in nodes such as the serving gateway (SGW) or the MME and any WiFi compliant traffic may end up in an edge router or an Evolved Packet Data Gateway (ePDG).

Moreover, for a given radio access technology (RAT), QoS differentiation is provided to the end-users (i.e., to the end-user terminals of the end-users) so that e.g. guaranteed bitrate (GBR) services, such as voice calls, will not be disturbed by best effort (BE) services, such as web browsing. In order to enable this, QoS differentiation is needed also on the backhaul links.

If the wireless backhaul is based on LTE, there are tools that provide both the routing functions and QoS differentiation, such as based on the LTE bearer concept. Typically then, for each type of RAT, one GBR and one BE bearer are established on the backhaul links. Different frameworks may be used to prioritize between different traffic, for example to determine if 10 Mbit/s Voice over Internet protocol (VoIP) data to/from one end-user terminal is more or less prioritized than 100 Mbit/s web-surfing data to/from another end-user terminal.

In situations with low traffic, the peak-bitrate provided/ offered to the end-user terminals may be limited by the peak-bit rate of the backhaul link. In situations with high traffic load, the maximum capacity for each client node can be limited by the wireless backhaul link due to (interference and) several client nodes sharing the same sector of a hub (i.e., the same hub sector). This implies a decrease in the maximum capacity which a pico network node can provide/ offer the end-user terminals.

Since the traffic load pattern might change, the need for a certain backhaul capacity may change over time. In some cases, a hub sector may be able to provide several client nodes with sufficient backhaul capacity, whilst in other cases with more traffic load (or interference conditions), the backhaul link will define the limiting factor of the throughput for the end-user terminals. Hence, the client nodes connected to hub sectors which experience a backhaul limitation as described above will experience fluctuations in throughput depending on the momentary traffic load among the served client nodes, thus making it more difficult to guarantee the end-user terminals a certain throughput.

A similar situation occurs in a case the traffic of a client node is causing interference to other hub sectors than the hub sector serving the client node. Any such negatively affected hub sectors may have a severely limited maximum capacity of its backhaul link. This implies a decrease in the maximum capacity which a client node can provide/offer the end-user terminals.

In the above described cases, one common issue is that even though the individual wireless backhaul links are good (e.g., providing/offering high bitrate), the throughput is likely to be lower if the wireless backhaul links are shared and/or interfered.

Hence, there is still a need for an improved handling of wireless links in a wireless backhaul network.

SUMMARY

An object of embodiments herein is to provide improved handling of wireless links in a wireless backhaul network.

The inventors of the enclosed embodiments have realized that by aligning the client nodes such that the accumulated bitrates of all backhaul links are maximized without respect to backhaul limitations, the optimization of throughput is set aside, implying a non-optimal end-user throughput.

The inventors of the enclosed embodiments have further realized that by dynamically considering/choosing alternative hub sectors for the client nodes, it may be possible to avoid hub sector congestion and/or reduce interference and achieve higher network throughput. By making intelligent choices of alternative hub sectors for some client nodes depending on the traffic situation, the network capacity may be increased.

State of the art does not disclose any mechanisms that are needed for the interaction between the backhaul network and the end-user access network, nor the needed realignment functionality when using high gain narrow lobe antennas that is commonly deployed for wireless backhaul links.

A particular object is therefore to provide improved handling of wireless links in a wireless backhaul network by making intelligent choices. This may require additional coordination between nodes in the backhaul network and nodes in the end-user access network.

According to a first aspect there is presented a method for handling wireless links in a wireless backhaul network. The method is performed by a network node. The method comprises performing a redirection routine. The redirection routine comprises acquiring load information from an end-user access network and from a wireless backhaul network, the wireless backhaul network providing backhaul to the end-user access network according to a current network topology, the current network topology associating client nodes in the wireless backhaul network to hub node sectors of hub nodes in the wireless backhaul network. The redirection routine comprises associating the current network topology with a current performance value as a function of the acquired load information. The redirection routine comprises providing an estimated performance value for a new network topology according to which at least one wireless link for a client node has been redirected from a current hub node sector to a new hub node sector. The redirection routine comprises redirecting the at least one wireless link according to the new network topology in a case the estimated performance value is higher than the current performance value.

Advantageously this provides improved handling of wireless links in a wireless backhaul network.

Advantageously this provides improved handling of wireless links in a wireless backhaul network by making intelligent choices.

Advantageously, the wireless backhaul network can be adapted to, and manage, more traffic load yielding: higher network throughput, a network that is more robust against overload, and/or reduced experienced interference.

Advantageously this results in both the client node(s) which change(s) hub sector and the remaining client nodes (i.e. client nodes remaining in the old hub sector) having more resources available, thus leading to a higher throughput for all client nodes. In some cases, the client node which is directed to another hub sector might experience unchanged or lower throughput to provide a higher increase for the remaining client nodes, resulting in a higher total network throughput.

Advantageously, by making dynamic adjustments according to the current traffic situation, the wireless backhaul traffic may be distributed among different hub sectors depending on the current traffic source. This enables higher supported network traffic, especially for situations where the end-user traffic is concentrated in a relatively small geographical area as the traffic can be redistributed to a larger area in the wireless backhaul network.

According to a second aspect there is presented a network node for handling wireless links in a wireless backhaul network. The network node comprises a processing unit and a non-transitory computer readable storage medium. The non-transitory computer readable storage medium comprises instructions executable by the processing unit whereby the network node is operative to perform a redirection routine according to the first aspect.

According to a third aspect there is presented a computer program for handling wireless links in a wireless backhaul network, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
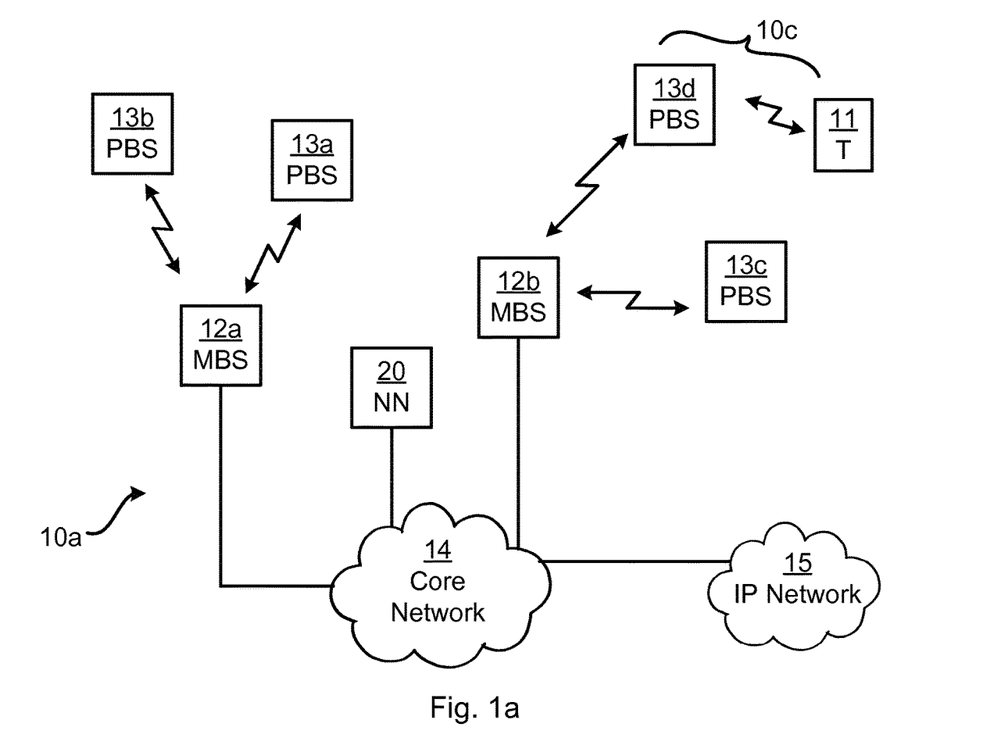
FIG. 1a is a schematic diagram illustrating a communications network according to embodiments.

FIG. 1a is a schematic diagram illustrating a communications network 10a where embodiments presented herein can be applied. The communications network 10a comprises macro radio base stations (MBS) 12a, 12b providing wireless backhaul to pico radio base stations (PBS) 13a, 13b, 13c, 13d. The macro radio base stations 12a-b are operatively connected to a core network 14 which in turn is operatively connected to a service providing Internet Protocol based service network 15. An end-user terminal 11 served by a pico radio base station 13a-d is thereby able to access services and data provided by the IP network 15. The end-user terminal 11 may have a wireless or a wired connection to the pico radio base station 13a-d. The pico radio base stations 13a-d and their respective links towards served end-user terminals 11 define an end-user access network 10c. The pico radio base stations 13a-d may provide one or a combination of several radio access technologies over its radio access links, e.g. 3GPP LTE, 3GPP HSPA (high speed packet access), 3GPP GSM (global system for mobile communications) or IEEE 802.11x ("WiFi"). Additionally, the pico radio base stations 13a-d may have one or more wired interfaces towards the end-user terminals 11. Each pico radio base station 13a-d needs to backhaul the end-user access network traffic and uses a wireless link towards a macro radio base station 12a-b for this purpose.

Figure 1B:
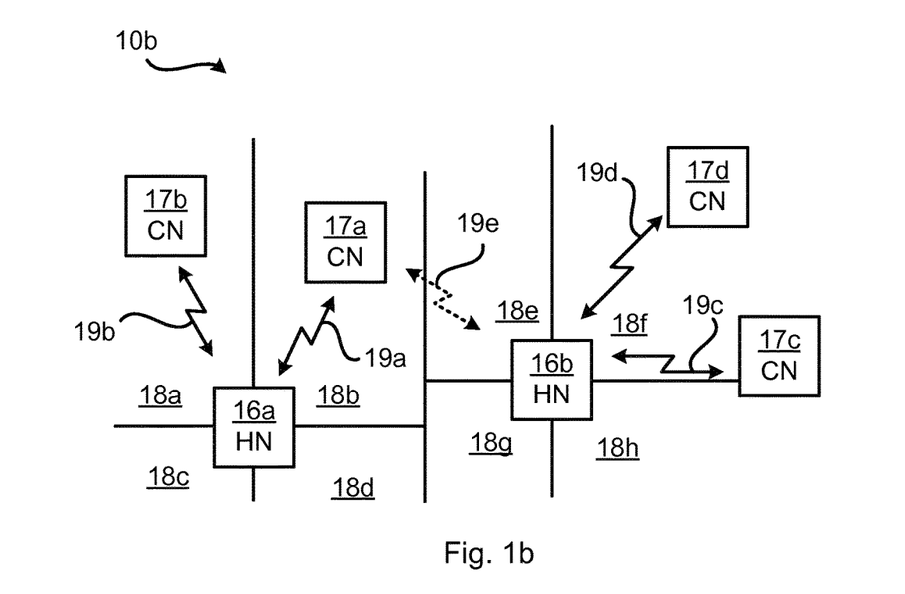
FIG. 1b is a schematic diagram illustrating a wireless backhaul network according to embodiments.

The pico radio base stations 13a-d may be backhauled by means of "client nodes" and "hub nodes". In general terms, the client node and the hub node are logical entities. The client node establishes a backhaul connection to the core network via the hub node. In case of a wireless backhaul, the term "client node" thus denotes the unit (or subunit within a micro or pico radio base station) that connects the micro or pico radio base station 13a-d to the hub node. The hub node denotes the other end (with respect to the client node) of the wireless backhaul link where the wireless backhaul continues over a wired or wireless connection to the core network. The hub node may be co-located with a macro radio base station 12a-b. Hence, the hub node may be implemented in a macro radio base station, and the client node may be implemented in a micro radio base station or a pico radio base station. However, the pico radio base station 13a-d and client node 17a-d do not have to be co-located. The same applies for the hub node 16a-d and the macro radio base station 12a-b.

FIG. 1b is a schematic diagram illustrating a wireless backhaul network 10b where embodiments presented herein can be applied. As schematically illustrated in FIG. 1b, the hub nodes 16a-b are arranged to transmit in a set of transmit directions, hereinafter denoted hub sectors 18a, 18b, 18c, 18d, 18e, 18f, 18g, 18h. The client nodes 17a, 17b, 17c, 17d are arranged to receive in a set of receive directions. Particularly, wireless links 19a, 19b, 19v, 19d are established between the hub nodes 16a-b and the client nodes 17a-d. The configuration of wireless links between hub nodes 16a-b and client nodes 17a-d define a network topology. Hence, a network topology associates client nodes 17a-d in the wireless backhaul network 10b to hub node sectors 18a-h of hub nodes 16a-b in the wireless backhaul network 10b.

In general terms, client nodes 17a-d (for example implemented in pico radio base station 13a-d) are deployed to meet high traffic demands. In situations with high traffic load, the maximum capacity for a client node 17a-d may be severely limited by its wireless backhaul link due to (interference and) several client nodes sharing the same hub sector. This implies a decrease in the maximum capacity which a pico radio base station 13a-d can provide/offer the end-user terminals 11 due to the usage of resources by the other client nodes in the wireless backhaul network 10b.

In current state of the art schemes, the links between the hub nodes and the client nodes are chosen to maximize the bitrate of the link without consideration of load or interference. In some cases, a hub sector might be able to provide several client nodes with sufficient backhaul capacity, whilst in other cases with more traffic load (or worse link conditions), the backhaul link will be the limitation of the throughput for the end-user terminals 11. With a fixed connection to one hub sector, a client node may thus experience a backhaul limitation as described above. This could be experienced as fluctuations in throughput for end-user terminals 11 depending on the momentary traffic load among the other client nodes. This could imply that it is more difficult for the pico radio base station 13a-d to guarantee the end-user terminals 11 a certain QoS.

The embodiments disclosed herein relate to handling wireless links in a wireless backhaul network 10b. In order to obtain such handling of wireless links in a wireless backhaul network 10b there is provided a network node, a method performed by the network node, and a computer program comprising code, for example in the form of a computer program product, that when run on the network node, causes the network node to perform the method.

Figure 2A:
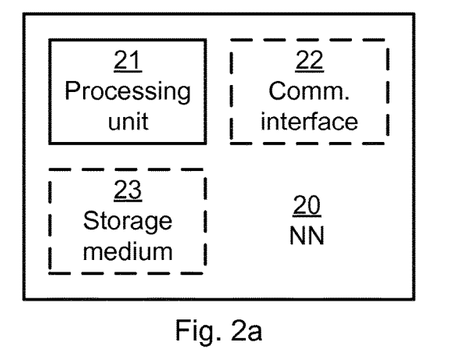
FIG. 2a is a schematic diagram showing functional modules of a network node according to an embodiment.

FIG. 2a schematically illustrates, in terms of a number of functional modules, the components of a network node 20 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 3), e.g. in the form of a storage medium 23. Thus the processing unit 21 is thereby arranged to execute methods as herein disclosed. The a storage medium 23 may also comprise persistent storage, which, for example, can be any single one or combination of magnetic memory, optical memory, solid state memory or even remotely mounted memory. The network node 20 may further comprise a communications interface 22 for communications with any of at least one hub node 16a, 16b and at least one client node 17a, 17b, 17c, 17d. As such the communications interface 22 may comprise one or more transmitters and receivers, comprising analogue and digital components and a suitable number of antennas for radio communications and/or interfaces for wired communications. The processing unit 21 controls the general operation of the network node 20 e.g. by sending data and control signals to the communications interface 22 and the storage medium 23, by receiving data and reports from the communications interface 22, and by retrieving data and instructions from the storage medium 23. Other components, as well as the related functionality, of the network node 20 are omitted in order not to obscure the concepts presented herein.

Figure 2B:
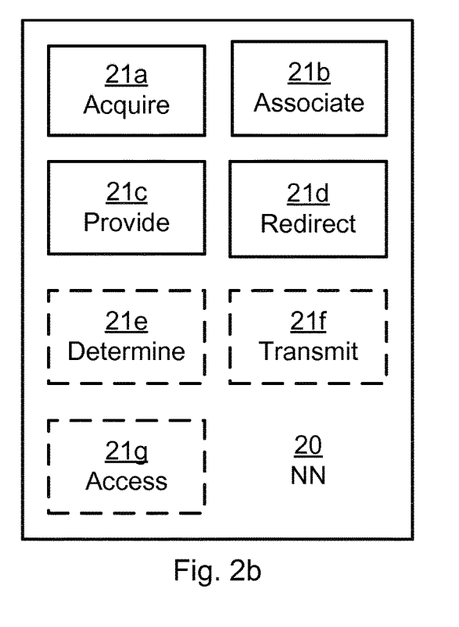
FIG. 2b is a schematic diagram showing functional units of a network node according to an embodiment.

FIG. 2b schematically illustrates, in terms of a number of functional units, the components of a network node 20 according to an embodiment. The network node 20 of FIG. 2b comprises a number of functional units; an acquire unit 21a, an associate unit 21b, a provide unit 21c, and a redirect unit 21d. The network node 20 of FIG. 2b may further comprises a number of optional functional units, such as any of a determine unit 21e, a transmit unit 21f, and an access unit 21g. The functionality of each functional unit 21a-g will be further disclosed below in the context of which the functional units may be used. In general terms, each functional unit 21a-g may be implemented in hardware or in software. The processing unit 21 may thus be arranged to from the storage medium 23 fetch instructions as provided by a functional unit 21a-g and to execute these instructions, thereby performing any steps as will be disclosed hereinafter.

The network node 20 may be provided as a standalone device or as a part of a further device. For example, the network node 20 may be provided as part of a radio base station, such as an evolved Node B.

The network node 20 may be provided as an integral part of the radio base station. That is, the components of the network node 20 may be integrated with other components of the radio base station some components of the radio base station and the network node 20 may be shared. For example, if the radio base station as such comprises a processing unit, this processing unit may be arranged to perform the actions of the processing unit 21 of the network node 20. Alternatively the network node 20 may be provided as a separate unit in the radio base station.

Figure 3:
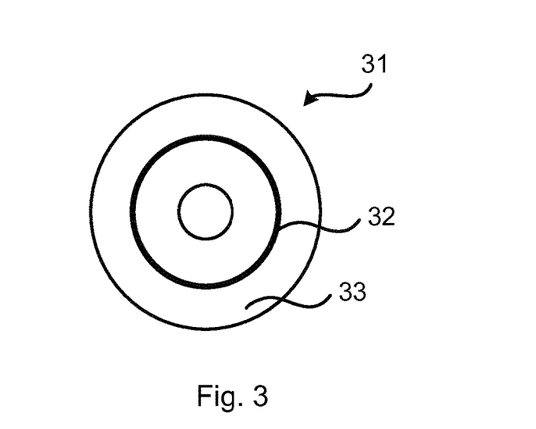
FIG. 3 shows one example of a computer program product comprising computer readable means according to an embodiment.
Figure 4:
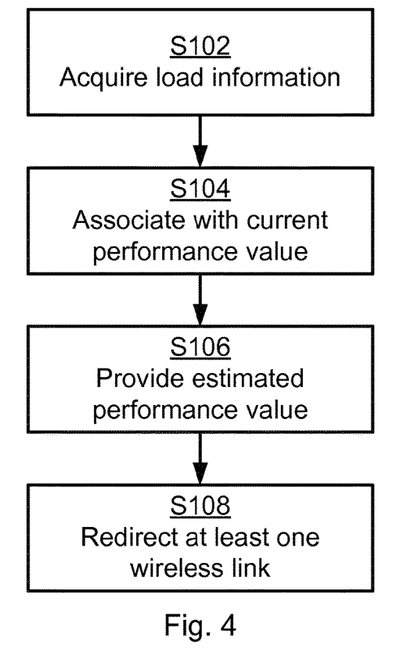
FIGS. 4 and 5 are flowcharts of methods according to embodiments.
Figure 5:
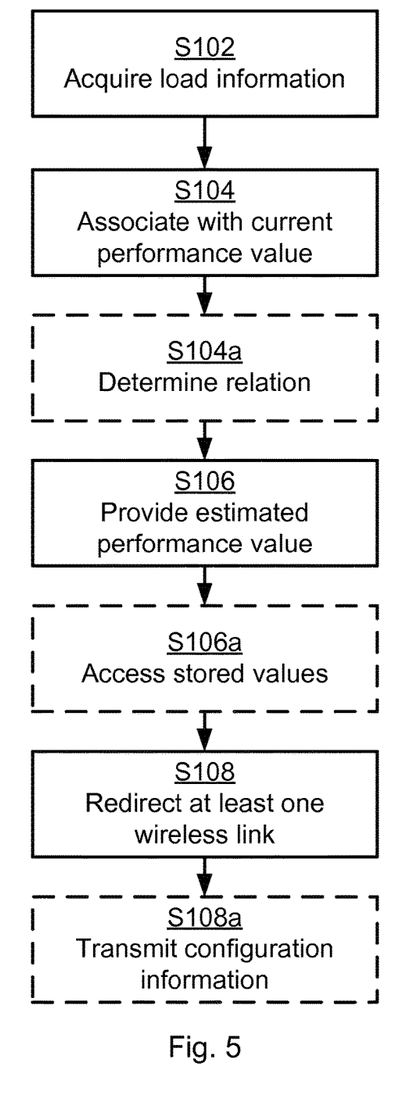

FIGS. 4 and 5 are flow chart illustrating embodiments of methods for handling wireless links in a wireless backhaul network 10b. The methods are performed by the network node 20. The methods are advantageously provided as computer programs 32. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23 to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Reference is now made to FIG. 5 illustrating a method for handling wireless links in a wireless backhaul network 10b according to an embodiment.

The method comprises performing a redirection routine. The redirection routine comprises steps as will be disclosed next.

The method involves considerations regarding redirecting backhaul links based on load in the end-user access network 10c and the wireless backhaul network 10b. The processing unit 21 of the network node 20 is therefore arranged to, in a step S102, acquire load information from the end-user access network 10c and from the wireless backhaul network 10b. As noted above, the wireless backhaul network 10b provides backhaul to the end-user access network 10c according to a current network topology. The current network topology associates client nodes 17a, 17b, 17c, 17d in the wireless backhaul network 10b to hub node sectors 18a, 18b, . . . , 18h of hub nodes 16a, 16b in the wireless backhaul network 10b.

In order to determine if any change to the current network topology would result in improved performance of the wireless backhaul network 10b, a comparison is made between performance of the current network topology and performance of at least one new network topology. The processing unit 21 of the network node 20 is therefore arranged to, in a step S104, associate the current network topology with a current performance value. The current performance value of the current network topology is a function of the acquired load information. Hence, the current performance value for the current network topology may be determined based on the acquired load information.

Performance for at least one new network topology is then determined. The processing unit 21 of the network node 20 is thus arranged to, in a step S106, provide an estimated performance value for a new network topology. According to the new network topology at least one wireless link 19a, 19b, 19c, 19d for a client node has been redirected from a current hub node sector to a new hub node sector.

If the new network topology yields an improved performance the current network topology may be replaced by the new network topology. Particularly, the processing unit 21 of the network node 20 is arranged to, in a step S108, redirect the at least one wireless link according to the new network topology in a case the estimated performance value is higher than the current performance value.

That is, if the load information received from the end-user access network 10c and the wireless backhaul system and the estimated future performance fulfills certain predefined conditions, a realignment action may be performed.

Embodiments relating to further details of handling wireless links in a wireless backhaul network 10b will now be disclosed.

There may be different examples of load information that may be acquired. For example, the acquired load information may comprise bitrate of end-user terminals 11 in the end-user access network 10c backhauled by the wireless backhaul network 10b. For example, the acquired load information may comprise QoS information associated with the end-user terminals 11. For example, the acquired load information may comprise resource utilization in the end-user access network 10c. The load information may comprise raw or processed measured performance information relating to these examples. The acquired load information may comprise a combination of the above mentioned examples.

The current performance value may relate to different properties. Different examples relating thereto will now be described in turn. For example, the current performance value may relate to resource usage of the at least one wireless link before having been redirected. For example, the current performance value may relate to spectral efficiency and/or bitrate of the at least one wireless link before having been redirected. For example, the current performance value may relate to interference contribution from the at least one wireless link to other wireless links in the wireless backhaul network 10b before the at least one wireless link having been redirected. For example, the current performance value may relate to energy consumption of the wireless backhaul network 10b. The current performance value may relate to a combination of these examples.

The estimated performance value may relate to different properties. Different examples relating thereto will now be described in turn. For example, the estimated performance value may relate to estimated resource usage of the at least one wireless link after having been redirected. For example, the estimated performance value may relate to spectral efficiency and/or bitrate of the at least one wireless link after having been redirected. For example, the estimated performance value may relate to interference contribution from the at least one wireless link to other wireless links in the wireless backhaul network 10b after the at least one wireless link having been redirected. For example, the estimated performance value may relate to bitrate information for the end-user access network 10c and the wireless backhaul network 10b. For example, the estimated performance value may relate to QoS information in the end-user access network 10c. For example, the estimated performance value may relate to energy consumption of at least one of the end-user access network 10c and the wireless backhaul network 10b. The estimated performance value may relate to a combination of these examples.

There may be different examples of from where the load information may be acquired. For example, the load information may be acquired from at least one client node 17a, 17b, 17c, 17d in the end-user access network 10c and from at least two hub nodes 16a, 16b in the wireless backhaul network 10b.

The step S106 of providing an estimated performance value may be repeated for a set of wireless links between at least one client node and at least two hub node sectors until the estimated performance value is higher than the current performance value, or until a time-out event occurs. Hence the performance may be estimated for different network topologies until either a network topology is found which provides better estimated performance than the current performance of the current network topology or for a predetermined number of iterations or during a predetermined time interval.

The redirection routine may be repeated at regular intervals. For example, the redirection routine may be repeated each 10 ms, each 100 ms, each 1 s, each 10 s, each minute, each hour, each day, or each week.

There may be different conditions for performing the redirection as in step S108. Different embodiments relating thereto will now be described in turn. One condition for realignment of a candidate client node may be that the estimated interference from the client node, i.e. the interference created by downlink transmissions to the client node or the uplink interference created by the transmissions from the client node is above a threshold. Thus, according to an embodiment the at least one wireless link is redirected according to the new network topology in a case interference of the at least one wireless link between the client node and the current hub node sector is higher than a predetermined threshold value.

One condition for realignment of a candidate client node may be that one or more load measures (e.g. utilization, interference etc.) for the hub sector serving the client node is above a threshold. Thus, according to an embodiment the at least one wireless link is redirected according to the new network topology in a case a current load of the current hub node sector is higher than a predetermined threshold value.

One condition for realignment of a candidate client node may be that the radio quality to an alternative hub sector is above a threshold. Thus, according to an embodiment the at least one wireless link is redirected according to the new network topology in a case a current radio quality of the new hub node sector is higher than a predetermined threshold value.

One condition for realignment of a candidate client node may be that one or more load measures (e.g. utilization, currently experienced uplink interference and predicted downlink interference for the client node) for an alternative hub sector are below a threshold. Thus, according to an embodiment the at least one wireless link is redirected according to the new network topology in a case a current load of the new hub node sector is lower than a predetermined threshold value.

At least one of the above conditions may be used to form a trigger for performing the redirection routine.

Reference is now made to FIG. 5 illustrating methods for handling wireless links in a wireless backhaul network 10b according to further embodiments.

There may be different ways to determine the current performance value. According to an embodiment the processing unit 21 of the network node 20 is arranged to, in an optional step S104a, determine a relation between the acquired load information from the end-user access network 10c and the acquired load information from the wireless backhaul network 10b. The current performance value may then be determined therefrom. This relation may be defined by a correlation measure between the acquired load information from the end-user access network 10c and acquired load information from the wireless backhaul network 10b. Step S104a may be part of step S104 as disclosed above.

There may be different ways to determine the estimated performance value. For example, the estimated performance value may be based on knowledge about antenna gain patterns for the antennas of the radio network nodes of the hub nodes and the client nodes, respectively.

For example, the performance may be premeasured for different realignment opportunities. This can be performed, for example, during installation or during low traffic in the backhaul network. Values obtained during such pre-measurements may be stored. According to an embodiment the processing unit 21 of the network node 20 is therefore arranged to, in an optional step S106a, access stored values of historically acquired load information from the end-user access network 10c and the wireless backhaul network 10b when providing said estimated performance value.

There may be further ways to determine that the at least one wireless link is to be redirected. Different examples relating thereto will now be described in turn. In principle, a realignment procedure may be initiated when the estimated performance is such that realignment is beneficial.

For example, the redirecting may involve moving a client node to a hub sector with worse path gain but lower traffic load. That is, the at least one wireless link from the client node to the new hub node sector may have a worse path gain than the at least one wireless link from the client node to the current hub node sector.

For example, the redirecting may involve moving a wireless link to a second strongest path. That is, the client node may have a strongest path to the current hub node sector, and the client node may have a second strongest path to the new hub node sector.

For example, the redirecting may result in unchanged bitrate and lower congestion. That is, the at least one wireless link may be redirected so as to lower congestion in the wireless backhaul network 10b.

For example, the redirecting may involve transmitting instructions to any affected hub node and/or client node. That is, the processing unit 21 of the network node 20 may be arranged to, in an optional step S108, transmit configuration information relating to the new network topology to at least one of the client node, the (hub node of the) current hub node sector, and the (hub node of the) new hub node sector.

Figure 6:
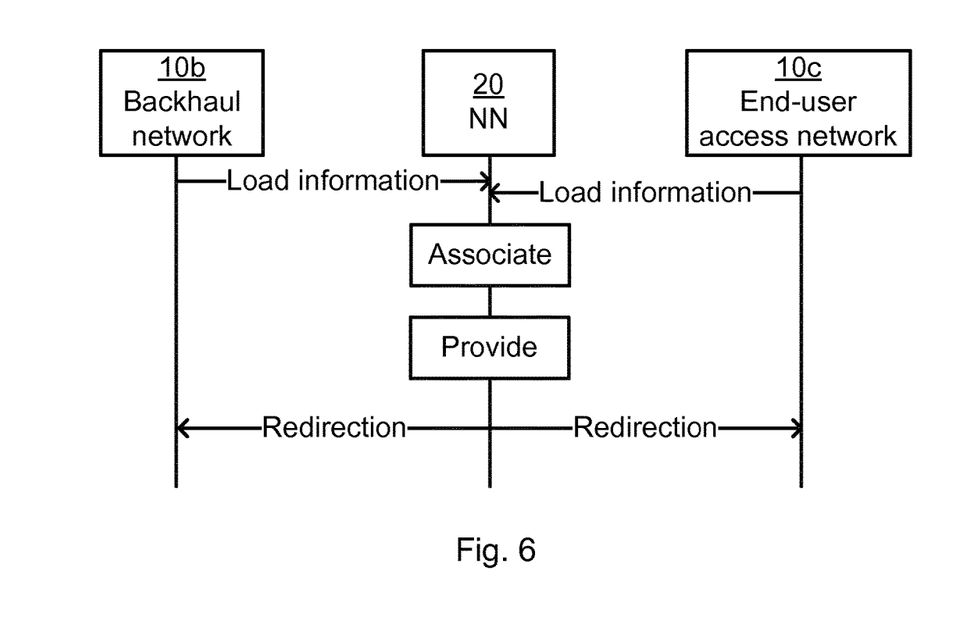
FIGS. 6 and 7 are sequence diagrams of methods according to embodiments.

FIG. 6 is a sequence diagram illustrating a method for handling wireless links in a wireless backhaul network 10b. First, load information is acquired by the network node 20 from an end-user access network 10c 10c and from a wireless backhaul network 10b (as in step S102). The network node 20 then performs step S104 ("Associate") and step S106 ("Provide"). Performing step S104 may comprise performing step S104a. Performing step S106 may comprise performing step S106a. Then, a redirection order is transmitted by the network node 20 to the end-user access network 10c and the wireless backhaul network 10b (as in step S108), assuming that a new network topology with improved performance compared to that of the current network topology has been found. Performing step S108 may comprise performing step S108a.

The affected client node(s) and hub node(s) may then perform the appropriate realignment procedure(s) based on the configuration information. Such actions may involve adjusting respective antenna systems of the affected client node(s) and/or hub node(s). For example, during such an realignment procedure the antenna system may be given an order to realign.

Figure 7:
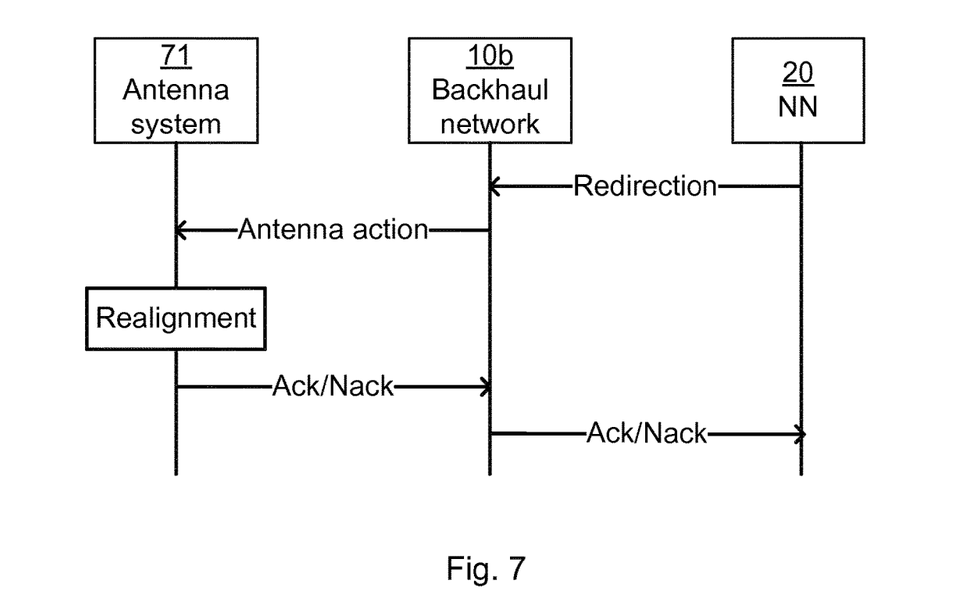

FIG. 7 is a sequence diagram illustrating a realignment procedure. First, a redirection order is transmitted by the network node 20 to the wireless backhaul network 10b (as in step S108). Performing step S108 may comprise performing step S108a. The wireless backhaul network 10b translates the received redirection order into an antenna action representative of the realignment procedure. This antenna action is transmitted to the antenna system 71 of the wireless backhaul network 10b.

There may be different examples of how the antenna system may perform the realignment procedure in different ways. Different examples relating thereto will now be described in turn.

For example, the order may involve the antenna system to update a software description of a beam-forming vector.

For example, the order may involve the antenna system to by mechanical mean, for example using a step-motor, to physically realign one or more physical components of the antenna system.

For example, the order may involve the antenna system to request a person, such as a technician, to realign one or more physical components of the antenna system, and/or to update software of the antenna system.

Once the realignment has been completed, the antenna system 71 transmits an acknowledgement ("Ack") message to the wireless backhaul network 10b which in turn forwards the acknowledgement message to the network node 20. Alternatively, the antenna system 71 is not able to complete the realignment, the antenna system 71 transmits a negative-acknowledgement ("Nack") message to the wireless backhaul network 10b which in turn forwards the negative-acknowledgement message to the network node 20.

There may be further ways to determine which at least one wireless link to select as a candidate link for being redirected from a current node sector to a new node sector. Different considerations relating thereto will now be described in turn. For example, the selection may involve using an optimization routine. The processing unit 21 of the network node 20 may thus be arranged to perform such an optimization routine. Instructions implementing the optimization routine may be stored in the storage medium 23.

In general terms, the optimization routine may be based on a utility function U(a) that measures or estimates the performance of the wireless backhaul network 10b or parts thereof for a specific alignment a, where this specific alignment thus corresponds to a specific network topology. During the optimization the optimization routine considers a set A of such possible alignments a. One factor for the value of the utility function is the throughput of the end-users. Other factors may also be considered in the utility function, for example, the QoS of the end-users, the power consumption of the wireless backhaul network 10b, etc. The determination of the utility function may make use of any number steps, for example, involving estimating channel and interference conditions.

For the set A of possible alignments the best (i.e., yielding maximum performance) alignment $a_{new}$ is picked. That is:

$$a_{new} = \mathrm{argmax}_{a \, in \, A}(U(a)).$$

The new alignment $a_{new}$ may be picked from a set of possible realignments A close to the old alignment $a_{old}$. In this context we defined the distance $d(a_1, a_2)$ between two alignments as the number of wireless backhaul links that differ between alignment $a_1$ and alignment $a_2$; that is, if $d(a_1, a_2)=1$ then one wireless backhaul link needs to be realigned in $a_1$ to get $a_2$, i.e., to arrive at the new network topology from the current network topology. Hence one option is to choose the set A of possible alignments as $$A = \{a | d(a, a_{old}) \leq N\},$$

where $N \geq 1$ is an integer. Hence if N=1, only one wireless backhaul link is realigned at a time; if N=2, two wireless backhaul links are simultaneously realigned, etc. In principle, N may be as large as the number of client nodes in the part of the wireless backhaul network 10b that is to be optimized. In principle, N may be selected large enough such that all wireless backhaul links may be realigned simultaneously, thereby finding the global maximum of U(a).

Illustrative scenarios where the herein disclosed embodiments for handling wireless links in a wireless backhaul network 10b may be applicable will now be disclosed.

For example, in a scenario where client nodes are associated with hub sectors according to a network topology where wireless links provide the best path-gain, the number of hub nodes served might differ a lot between different hub sectors. This choice of network topology may be optimal at low network load when the wireless links are noise limited. As the traffic load increases the client nodes may, however, be limited by properties of the shared wireless backhaul network 10b, possibly leading to worse end-user performance. By performing redirecting as in step S108 involving moving some of the client nodes to hub sectors with worse path gain but lower traffic load, the client nodes (especially the client nodes that are not moved) may have higher throughput. This can be the result of less congested hub sectors as well as less interference.

For example, in a scenario with low traffic load, the wireless links are mostly limiting for end-users with high peak bitrate. In such a low traffic load case, it may be likely that end-users will transmit individually in the end-user access network 10c, which means that the end-users may use all the resources and achieve peak-bitrate. This peak-bitrate may be a higher than is supported by the wireless backhaul network 10b. Hence in this scenario all the client nodes should be served from their best hub sector.

As an example, consider the network topology of the wireless backhaul network 10b in FIG. 1b. Assume that client node 17a currently is backhauled by hub sector 18b of hub node 16a via wireless link 19a. Assume further that the maximum bitrate of this wireless link 19a is 30 Mbps. In case the traffic around client node 17a increases, for example as a result of the number of end-user terminals 11 served by the pico radio base station 13a associated with the client node 17a increases, the capacity of wireless link 19a may not be sufficient. Assume now that client node 17a may also be served by hub sector 18e of hub node 16b via wireless link 19e having a capacity of 50 Mbps. A redirection order may thus force the client node 17a to instead be served by hub sector 18e of hub node 16b via wireless link 19e, although the geographical distance between hub node 16b and client node 17a is larger than the geographical distance between hub node 16a and client node 17a.

As an example, consider again the network topology of the wireless backhaul network 10b in FIG. 1b. In case the traffic around client node 17c increases, suddenly the backhaul link 19d nearby served by the same node sector 18f will see increased traffic and might be limited by the wireless backhaul as client nodes 17c and 17d may need to simultaneously transmit large amounts data. This means that hub sector 18f which serves client nodes 17c and 17d may not provide them with their full backhaul speed as the resources must be shared among the two client nodes. If client node 17c instead realigns and connects to another hub sector according to the alternative path towards hub sector 18h the hub sector 18f will have more resources for serving client node 17d, meaning that client node 17d may achieve a higher throughput. Client node 17c may also achieve a higher throughput as it may be served more resources from the new hub sector 18h.

Another example is a scenario when one of the hub sectors is placed vertically high such that many client nodes may have line of sight (LOS) to this hub sector. A LOS-link would then perhaps be the best path for most of the client nodes. However, if client nodes would choose the strongest path (i.e., the LOS-path), this hub sector would have to share its resources among all the connecting client nodes, thus making it likely that the ensemble of backhaul links becomes limited and a bottle neck for all the client nodes (even though for a single link, it would be the best choice). It would instead be more efficient if only some of the client nodes aligned and connected to the LOS-hub sector whilst the other client nodes remain connected to other hub sectors (although with worse path gain). This clearly shows the need of taking the backhaul limitation into account as the optimal bitrate does not necessarily imply optimal throughput. At low traffic, having all the client nodes operatively connected towards the hub nodes which are placed vertically high (i.e., in cases of LOS) may be preferable and may enable power saving in many hub nodes.

Yet another example where realignment may be beneficial is in scenarios where realignment implies unchanged bitrate and lower congestion. This may occur when the signal to interference and noise ratio (SINR) of the signal through both the strongest path and the alternative path are high enough such that the bitrate is saturated. For example, assume that two client nodes 17c, 17d are sharing the same hub sector 18f and that they both have a SINR of 50 dB. Assume that client node 17c has an alternative path to hub node sector 18h which would result in a 43 dB SINR and that the new hub sector 18h currently is not serving any client nodes. This means that the bit rate would remain unchanged while the throughput increases for high traffic load situations.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling wireless links in a wireless backhaul network, the method being performed by a network node, the method comprising performing a redirection routine comprising the steps of:
   acquiring load information from an end-user access network and from a wireless backhaul network, said wireless backhaul network providing backhaul to said end-user access network according to a current network topology, said current network topology associating client nodes in the wireless backhaul network to hub node sectors of hub nodes in the wireless backhaul network;
   associating the current network topology with a current performance value as a function of the acquired load information;
   providing an estimated performance value for a new network topology according to which at least one wireless link for a client node has been redirected from a current hub node sector to a new hub node sector; and
   redirecting said at least one wireless link according to said new network topology in a case said estimated performance value is higher than said current performance value.

2. The method according to claim 1, wherein the acquired load information comprises at least one of:
   bitrate of end-user terminals in the end-user access network backhauled by the wireless backhaul network;
   Quality of Service, QoS, information associated with said end-user terminals; and
   resource utilization in the end-user access network.

3. The method according to claim 1, wherein said step of associating further comprises:
   determining a relation between the acquired load information from the end-user access network and the acquired load information from the wireless backhaul network; and
   wherein said current performance value is determined therefrom.

4. The method according to claim 1, wherein said current performance value relates to at least one of:
   resource usage of said at least one wireless link before having been redirected;
   spectral efficiency and/or bitrate of said at least one wireless link before having been redirected;
   interference contribution from said at least one wireless link to other wireless links in the wireless backhaul network before said at least one wireless link having been redirected; and
   energy consumption of the wireless backhaul network.

5. The method according to claim 1, wherein said estimated performance value relates to at least one of:
   estimated resource usage of said at least one wireless link after having been redirected;
   spectral efficiency and/or bitrate of said at least one wireless link after having been redirected;
   interference contribution from said at least one wireless link to other wireless links in the wireless backhaul network after said at least one wireless link having been redirected;

bitrate information for the end-user access network and the wireless backhaul network;

Quality of Service, QoS, information in the end-user access network; and energy consumption of at least one of the end-user access network and the wireless backhaul network.

6. The method according to claim 1, wherein said at least one wireless link is redirected according to said new network topology in a case interference of said at least one wireless link between said client node and said current hub node sector is higher than a predetermined threshold value.

7. The method according to claim 1, wherein said at least one wireless link is redirected according to said new network topology in a case a current load of said current hub node sector is higher than a predetermined threshold value.

8. The method according to claim 1, wherein said at least one wireless link is redirected according to said new network topology in a case a current load of said new hub node sector is lower than a predetermined threshold value.

9. The method according to claim 1, wherein said at least one wireless link from said client node to said new hub node sector has worse path gain than said at least one wireless link from said client node to said current hub node sector, and wherein said new hub node sector has lower traffic load than said current hub node sector.

10. The method according to claim 1, wherein said client node has a strongest path to said current hub node sector, and wherein said client node has a second strongest path to said new hub node sector.

11. The method according to claim 1, wherein said at least one wireless link is redirected so as to lower congestion in said wireless backhaul network.

12. The method according to claim 1, wherein redirecting said at least one wireless link further comprises:

transmitting configuration information relating to said new network topology to at least one of said client node, said current hub node sector, and said new hub node sector.

13. The method according to claim 1, further comprising:

accessing stored values of historically acquired load information from the end-user access network and the wireless backhaul network when providing said estimated performance value.

14. The method according to claim 1, wherein the load information is acquired from at least one client node in the end-user access network and from at least two hub nodes in the wireless backhaul network.

15. The method according to claim 1, wherein said step of providing an estimated performance value is repeated for a set of wireless links between at least one client node and at least two hub node sectors until said estimated performance value is higher than said current performance value, or until a time-out event occurs.

16. The method according to claim 1, wherein said redirection routine is repeated at regular intervals.

17. The method according to claim 1, wherein said redirection routine is repeated each 10 ms, each 100 ms, each 1 s, each 10 s, each minute, each hour, each day, or each week.

18. The method according to claim 1, wherein the hub node is implemented in a macro radio base station.

19. The method according to claim 1 wherein the client node is implemented in a micro radio base station or a pico radio base station.

20. A network node for handling wireless links in a wireless backhaul network, the network node comprising a processor and a non-transitory computer readable storage medium, said non-transitory computer readable storage medium comprising instructions executable by said processor whereby said network node is operative to:

acquire load information from an end-user access network and from a wireless backhaul network, said wireless backhaul network providing backhaul to said end-user access network according to a current network topology, said current network topology associating client nodes in the wireless backhaul network to hub node sectors of hub nodes (16a, 16b) in the wireless backhaul network;

associate the current network topology with a current performance value as a function of the acquired load information;

provide an estimated performance value for a new network topology according to which at least one wireless link for a client node has been redirected from a current hub node sector to a new hub node sector; and redirect said at least one wireless link according to said new network topology in a case said estimated performance value is higher than said current performance value.

21. The network node according to claim 20, wherein the network node is part of an evolved Node B.

22. A network node for handling wireless links in a wireless backhaul network, the network node comprising code stored by non-transitory computer readable storage media that when executed by a processor causes the network node to:

acquire load information from an end-user access network and from a wireless backhaul network said wireless backhaul network providing backhaul to said end-user access network according to a current network topology, said current network topology associating client nodes in the wireless backhaul network to hub node sectors of hub nodes in the wireless backhaul network;

associate the current network topology with a current performance value as a function of the acquired load information;

provide an estimated performance value for a new network topology according to which at least one wireless link for a client node has been redirected from a current hub node sector to a new hub node sector; and redirect said at least one wireless link according to said new network topology in a case said estimated performance value is higher than said current performance value.

23. The network node of claim 22, wherein the network node is part of an evolved Node B.

* * * * *